US012789775B2

(12) United States Patent
Chen

(10) Patent No.: US 12,789,775 B2
(45) Date of Patent: Nov. 10, 2026

(54) HYDRAULIC BRAKE WITH DUAL PISTON STRUCTURE

(71) Applicant: Ningbo Lewis Sports Goods Co., Ltd., Cixi City (CN)

(72) Inventor: Yonggang Chen, Cixi City (CN)

(73) Assignee: Ningbo Lewis Sports Goods Co., Ltd., Cixi City (CN)

( * ) Notice: Subject to any disclaimer, the term of this patent is extended or adjusted under 35 U.S.C. 154(b) by 370 days.

(21) Appl. No.: 18/621,971

(22) Filed: Mar. 29, 2024

(65) Prior Publication Data

US 2024/0391554 A1 Nov. 28, 2024

(30) Foreign Application Priority Data

Mar. 30, 2023 (CN) ......................... 202320691374.7
Apr. 20, 2023 (CN) ......................... 202320917334.X

(51) Int. Cl.
*B60T 11/22* (2006.01)
*B62L 3/02* (2006.01)

(52) U.S. Cl.
CPC ............... *B60T 11/22* (2013.01); *B62L 3/023* (2013.01)

(58) Field of Classification Search
CPC ......................... B62L 3/023; B60T 11/16–236
See application file for complete search history.

(56) References Cited

U.S. PATENT DOCUMENTS 4,189,287 A * 2/1980 Sindelar ................ B60T 11/236 417/493
8,739,949 B2 * 6/2014 Wang ...................... B60T 7/102 188/344
2002/0124562 A1 * 9/2002 Ishiwata ............... B60T 11/236 60/562
2006/0185360 A1 * 8/2006 Takizawa ................ B62L 3/023 60/547.1
2012/0085090 A1 * 4/2012 Gohr ....................... B62L 3/023 60/533
2012/0096850 A1 * 4/2012 Dunlap, III ............. B60T 11/22 60/585
2016/0090150 A1 * 3/2016 Kobayashi .............. B60T 7/102 60/533
2021/0179047 A1 * 6/2021 Bove ....................... B60T 11/22
2025/0304209 A1 * 10/2025 Chen ....................... B62L 3/023

* cited by examiner

*Primary Examiner* — David R Morris
(74) *Attorney, Agent, or Firm* — Rhodes IP PLC; Christopher R Rhodes

(57) ABSTRACT

A Hydraulic Brake with Dual Piston Structure includes a brake body, a handle, and a brake oil pipe; the brake body is provided with a pressure cylinder and a reservoir, and the pressure cylinder is provided with a piston assembly acted by the handle, and the pressure cylinder is connected to the reservoir through an oil pressure regulating hole. The piston assembly includes a front piston rod and a rear piston rod. The rear piston rod is provided with a push cavity, and the front piston rod is capable of entering the push cavity; an oil guiding cavity and an overflow hole in communication are provided on the front piston rod. The front piston rod is also sleeved with a one-way oil seal in contact with the inner wall of the pressure cylinder. The one-way oil seal is located in front of the overflow hole.

13 Claims, 17 Drawing Sheets

HYDRAULIC BRAKE WITH DUAL PISTON STRUCTURE

TECHNICAL FIELD

The present invention belongs to the technical field of brake products for vehicles, particularly to a Hydraulic Brake with Dual Piston Structure.

BACKGROUND ART

A brake is a device that has functions such as slowing down, stopping, or keeping a moving part (or moving machinery) in a stopped state. It is a mechanical part that stops or slows down the moving parts in the machinery. It is commonly known as a brake. A brake is mainly composed of a brake frame, brake parts, and a control device.

A brake is a type of brake that is an important part of vehicle safety. The quality of the brake often affects the life of the rider, especially for riders who often need to be in high-speed competitions. If the brake structure and efficiency are not comprehensive and perfect, even if the rider has high riding skills, they cannot control the bicycle as they wish, especially when riding at high speeds, regardless of whether the impulse or kinetic energy reaches its maximum value. If braking cannot be carried out smoothly, the lives of oneself or others cannot be guaranteed, and it is more likely to cause a large-scale disaster.

In vehicles such as bicycles, electric vehicles, and motorcycles, the device used to control the brake is a brake (commonly known as a brake lever). The brake lever is a handle for braking and is used in bicycle brake levers, children's bike handles, electric vehicle brake levers, motorcycle brake levers, etc. Traditionally, in the installation of brake wires for electric vehicles, bicycles, and tricycles, traditional tools such as wire pliers and wrenches are generally used in conjunction with brute force for tightening. This traditional wire tightening method has many disadvantages and is difficult to operate. For example, the wire is prone to slipping out of the pliers or wrench and it is not easy to adjust the tightness, which is particularly time-consuming and laborious. In order to pursue braking efficiency and accuracy, vehicles (such as motor vehicles and bicycles) on the market currently widely adopt hydraulic brakes, such as patent document TWM357417U, the principle of which is to combine one end of a brake oil pipe with the internal oil circuit of a brake handle seat and the other end of the brake oil pipe with a disc brake. It can be operated by pressing the handle to push an internal oil circuit piston rod, so that the pressure in the oil circuit acts on the disc brake through the brake oil pipe, thus forming the operation of the disc brake.

However, the existing hydraulic brake has structural defects that can lead to seal failure during use. Referring to patent document CN218641014U, it discloses a sectional power brake, including: a brake body provided with interconnected pressure cylinders and a reservoir; a piston rod assembly provided in the pressure cylinder; a handle connected to one end of the brake body; a brake oil pipe connected to the other end of the brake body; the piston rod assembly includes at least a movable piston rod and a fixed piston rod; the movable piston rod is connected to the handle transmission so that the movable piston rod can move relative to the fixed piston rod; the reservoir and the pressure cylinder are connected through a first oil delivery hole, and the pressure cylinder and the interior of the movable piston rod are connected through a second oil delivery hole, and the fixed piston rod is always connected to the interior of the movable piston rod; a first seal portion is provided on the movable piston rod, and a second seal portion is provided on the fixed piston rod. Among them, a first pressure regulating oil hole and a second pressure regulating oil hole are also provided between the reservoir and the pressure cylinder, and the first oil delivery hole, the first seal portion, and the second seal portion are all located between the first pressure regulating oil hole and the second pressure regulating oil hole. Brake oil can adaptively flow through the first pressure regulating oil hole and the second pressure regulating oil hole based on the pressure difference between the reservoir and the pressure cylinder.

In the aforementioned patent, there are a first pressure regulating oil hole, a first oil delivery hole, and a second pressure regulating oil hole between the pressure cylinder and the reservoir. Multiple hole positions are opened. According to the difference in their usage time and flow rate, some of them have a larger hole diameter, and the other part has a smaller hole diameter. In particular, the hole position with a smaller hole diameter is limited by its size and it is difficult to deburr it, so the surface of this part of the hole position is rougher. During use, the piston rod assembly drives the seal to continuously move back and forth. The seal will repeatedly contact the hole position during the movement, and the burrs at the hole position will scratch the seal, causing the seal to be damaged and the sealing effect to decrease or even fail; on the other hand, in order to match the oil circuit, two one-way oil seals need to be arranged on the piston rod assembly (front piston rod), which increases the chance of oil leakage and increases the cost.

SUMMARY OF THE INVENTION

In order to overcome the above-mentioned deficiencies in the prior art, the present invention provides a Hydraulic Brake with Dual Piston Structure, which upgrades the adjustment of the hole position and the oil circuit, and can realize the function of the brake with only one one-way oil seal, while also eliminating burrs in the hole position and preventing damage to the one-way oil seal.

The technical solution to solve the technical problems of the present invention is: a Hydraulic Brake with Dual Piston Structure, comprising a brake body, a handle connected to one end of the brake body, and a brake oil pipe connected to the other end of the brake body;

The brake body is provided with a pressure cylinder and a reservoir, and the pressure cylinder is provided with a piston assembly acted by the handle, and the pressure cylinder is mutually connected to the reservoir through an oil pressure regulating hole; the piston assembly includes a front piston rod and a rear piston rod, and the rear piston rod is provided with a push cavity, and the rear end of the front piston rod can enter the push cavity;

The front piston rod is provided with an oil guiding cavity, and a through-hole overflow hole is provided on the side wall of the front piston rod, and the overflow hole communicates with the oil guiding cavity;

A one-way oil seal is also sleeved on the front piston rod, the one-way oil seal is in contact with the inner wall of the pressure cylinder, and the one-way oil seal is located in front of the overflow hole;

In the first section of pinching the handle, the overflow hole and the rear piston rod are staggered from each other; the piston assembly drives the one-way oil seal to move forward, and the one-way oil seal squeezes the brake oil in the pressure cylinder and causes a part of the brake oil to enter the reservoir after passing through the oil guiding cavity, the overflow hole, and the oil pressure regulating hole in sequence; another part of the brake oil flows to the brake oil pipe;

In the middle and rear sections of pinching the handle, the rear end of the front piston rod enters the push cavity, and the front end of the rear piston rod abuts against the one-way oil seal and blocks the overflow hole; the piston assembly drives the one-way oil seal to move forward, and the one-way oil seal squeezes the brake oil in the pressure cylinder and causes the brake oil to flow to the brake oil pipe.

In some preferred embodiments of the present invention, a first elastic member is provided between the front end of the front piston rod and the pressure cylinder, and a second elastic member is provided between the rear end of the front piston rod and the rear piston rod.

As a further limitation of the above-mentioned embodiment, the spring elasticity of the first elastic member is greater than the spring elasticity of the second elastic member.

In some preferred embodiments of the present invention, an assembly groove is provided on the outer wall of the front piston rod, and the one-way oil seal is embedded in the assembly groove.

A further setting for the above-mentioned technical solution is that the front side of the one-way oil seal is a sealing side, and the sealing side is in contact with the inner wall of the pressure cylinder; the rear side of the one-way oil seal is a non-sealing side, and a lubrication gap is provided between the non-sealing side and the inner wall of the pressure cylinder.

A further setting for the above-mentioned technical solution is that a two-way seal is sleeved on the outer wall of the rear piston rod, and the two-way seal is in contact with the inner wall of the pressure cylinder.

In some preferred embodiments of the present invention, an oil injection hole is also provided on the side wall of the front piston rod, the overflow hole communicates with the oil guiding cavity, and the oil injection hole is located at the rear of the overflow hole;

It also includes an adjusting rod, the adjusting rod acts on the rear piston rod to adjust the initial position of the rear piston rod relative to the front piston rod, so that the rear piston rod can block or avoid the oil injection hole at the initial position.

A further setting for the above-mentioned technical solution is that the hole diameter of the oil injection hole is larger than the hole diameter of the overflow hole.

A further setting for the above-mentioned technical solution is that the handle is connected to the rear piston rod by a push rod assembly, the adjusting rod is provided on the push rod assembly, and the adjusting rod can move relative to the push rod assembly.

A further setting for the above-mentioned technical solution is that the push rod assembly is provided with an internal threaded hole, the adjusting rod is threaded through the internal threaded hole and forms a threaded connection with the push rod assembly; the front end of the adjusting rod can be in contact with the rear piston rod, and the rear end of the adjusting rod is provided with an adjustment portion.

A further setting for the above-mentioned technical solution is that the push rod assembly includes a push rod body and a driving sleeve, an external thread is provided on the outer wall of the push rod body, the driving sleeve is screw connected to the push rod body, and the handle forms a transmission fit with the driving sleeve through a bearing.

A further setting for the above-mentioned technical solution is that the push rod assembly also includes a ball head block, a transmission groove is provided at the rear end of the rear piston rod, the ball head block is inserted into the transmission groove, and the push rod body and the adjusting rod both form a transmission fit with the rear piston rod through the ball head block.

A further setting for the above-mentioned technical solution is that the ball head block is provided with a jacking hole, and the end of the adjusting rod is threaded through the jacking hole;

The front end of the push rod body extends outward to form a circle of flanges, a snap ring is provided at the rear of the rear piston rod, and the flange is provided between the snap ring and the rear piston rod.

The beneficial effects of the present invention are as follows:

1. A new oil circuit is formed by the oil guiding cavity and the overflow hole formed on the front piston rod, so only one oil pressure regulating hole is reserved between the pressure cylinder and the reservoir, and only one one-way oil seal is used on the piston assembly, which can realize the brake use function.

2. The redundant hole positions on the brake body are eliminated, and the hole diameter of the oil pressure regulating hole is larger, so fine processing can be performed on it to remove the burrs on the surface, thereby avoiding the one-way oil seal from being scratched by burrs during the movement of the piston assembly, which plays an effective protective role.

3. The only one-way oil seal not only plays the function of assisting the brake oil during braking, but also plays the function of one-way sealing, and can also play the function of blocking the overflow hole at a specific stage.

4. Reduce the number of one-way oil seals, reduce the chance of oil leakage, and reduce the difficulty of the process and the cost of parts.

5. During the production process, by adjusting the initial position of the rear piston rod, the rear piston rod is moved away from the front piston rod, so that the rear piston rod avoids the oil injection hole at the initial position, so that the oil injection hole is exposed, at this time The oil guiding cavity, oil injection hole, oil pressure regulating hole, and reservoir are connected in sequence, and sufficient brake oil can be smoothly injected into the reservoir from the pressure cylinder. Under this position state, the overflow hole is also exposed, so the overflow hole can also play the function of balancing pressure and assisting oil injection to further reduce the difficulty of oil injection and improve the efficiency of oil injection.

6. When the user uses it, the rear piston rod blocks the oil injection hole at the initial position, at this time the oil injection hole is covered and loses the function of oil circuit conduction; then, a new oil circuit is formed through the oil guiding cavity and the overflow hole formed on the front piston rod. The oil guiding cavity, the overflow hole, the oil pressure regulating hole, and the reservoir are connected in sequence to realize the oil circuit function and obtain a more linear brake feel.

Figure 1:
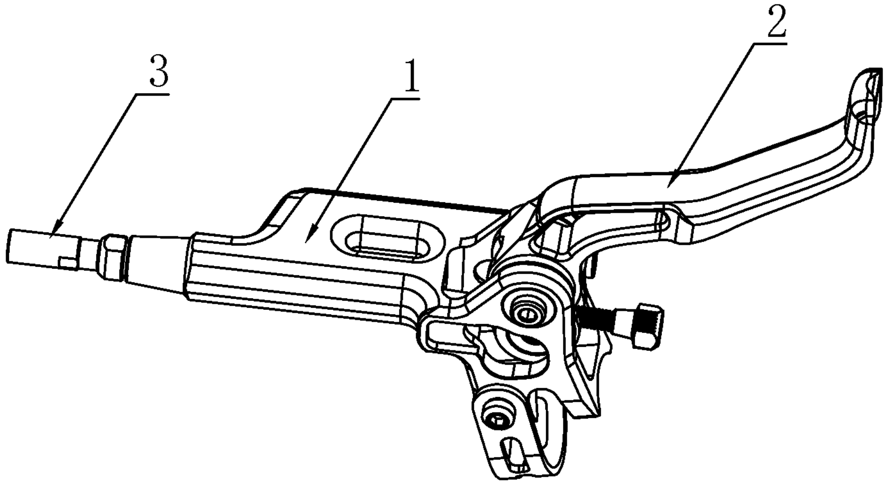
FIG. 1 is a schematic diagram of the appearance structure of the present invention.

In the drawings: 1, brake body; 101, pressure cylinder; 102, reservoir; 103, oil pressure regulating hole; 2, handle; 3, brake oil pipe; 4, front piston rod; 401, oil guiding cavity; 402, overflow hole; 403, assembly groove; 5, rear piston rod; 501, push cavity; 502, transmission groove; 6, one-way oil seal; 601, sealing side; 602, non-sealing side; 7, first elastic member; 8, second elastic member; 9, lubrication gap; 10, two-way seal; 11, adjusting rod; 1101, adjustment portion; 12, push rod assembly; 1201, internal threaded hole; 1202, push rod body; 1203, driving sleeve; 1204, external thread; 1205, flange; 13, snap ring; 14, soft rubber pad; 15, bearing; 16, ball head block; 1601, jacking hole; 17, oil injection hole.

SPECIFIC EMBODIMENTS

Hereinafter, the present invention will be further described in conjunction with the accompanying drawings and specific embodiments. It should be noted that the embodiments are only specific descriptions of the present invention, and their purpose is to help those skilled in the art to better understand the technical solution of the present invention, and should not be construed as limiting the present invention.

In the description of the present invention, it needs to be explained that if terms such as "center", "upper", "lower", "left", "right", "vertical", "horizontal", "inner", "outer", etc. appear, the orientation or positional relationship indicated is based on the orientation or positional relationship shown in the attached drawings. It is only for the purpose of facilitating the description of the present invention and simplifying the description, rather than indicating or implying that the referred device or element must have a specific orientation, be constructed and operated in a specific orientation, and therefore cannot be understood as a limitation on the present invention.

In the description of the present invention, it needs to be explained that unless there are other specific provisions and limitations, if terms such as "installation", "connection", and "connection" appear, they should be broadly understood, for example, they can be fixed connections, It can also be a detachable connection, or an integral connection; it can be a mechanical connection, or it can be an electrical connection; it can be a direct connection, or it can be indirectly connected through an intermediate medium, and it can be two components Internal connectivity. For those skilled in the art, the specific meaning of the above terms in the present invention can be understood according to the specific situation.

Embodiment 1

Referring to FIGS. 1 to 10, a Hydraulic Brake with Dual Piston Structure includes a brake body 1, a handle 2 connected to one end of the brake body 1, and a brake oil pipe 3 connected to the other end of the brake body 1;

The brake body 1 is provided with a pressure cylinder 101 and a reservoir 102, and the pressure cylinder 101 is provided with a piston assembly acted by the handle 2, and the pressure cylinder 101 is interconnected with the reservoir 102 through the oil pressure regulating hole 103; the piston assembly includes a front piston rod 4 and a rear piston rod 5, and the rear piston rod 5 is provided with a push cavity 501, and the rear end of the front piston rod 4 can enter the push cavity 501;

The front piston rod 4 is provided with an oil guiding cavity 401, and the side wall of the front piston rod 4 is provided with a through-hole overflow hole 402, and the overflow hole 402 communicates with the oil guiding cavity 401;

A one-way oil seal 6 is also sleeved on the front piston rod 4, the one-way oil seal 6 is in contact with the inner wall of the pressure cylinder 101, and the one-way oil seal 6 is located in front of the overflow hole 402.

Figure 3:
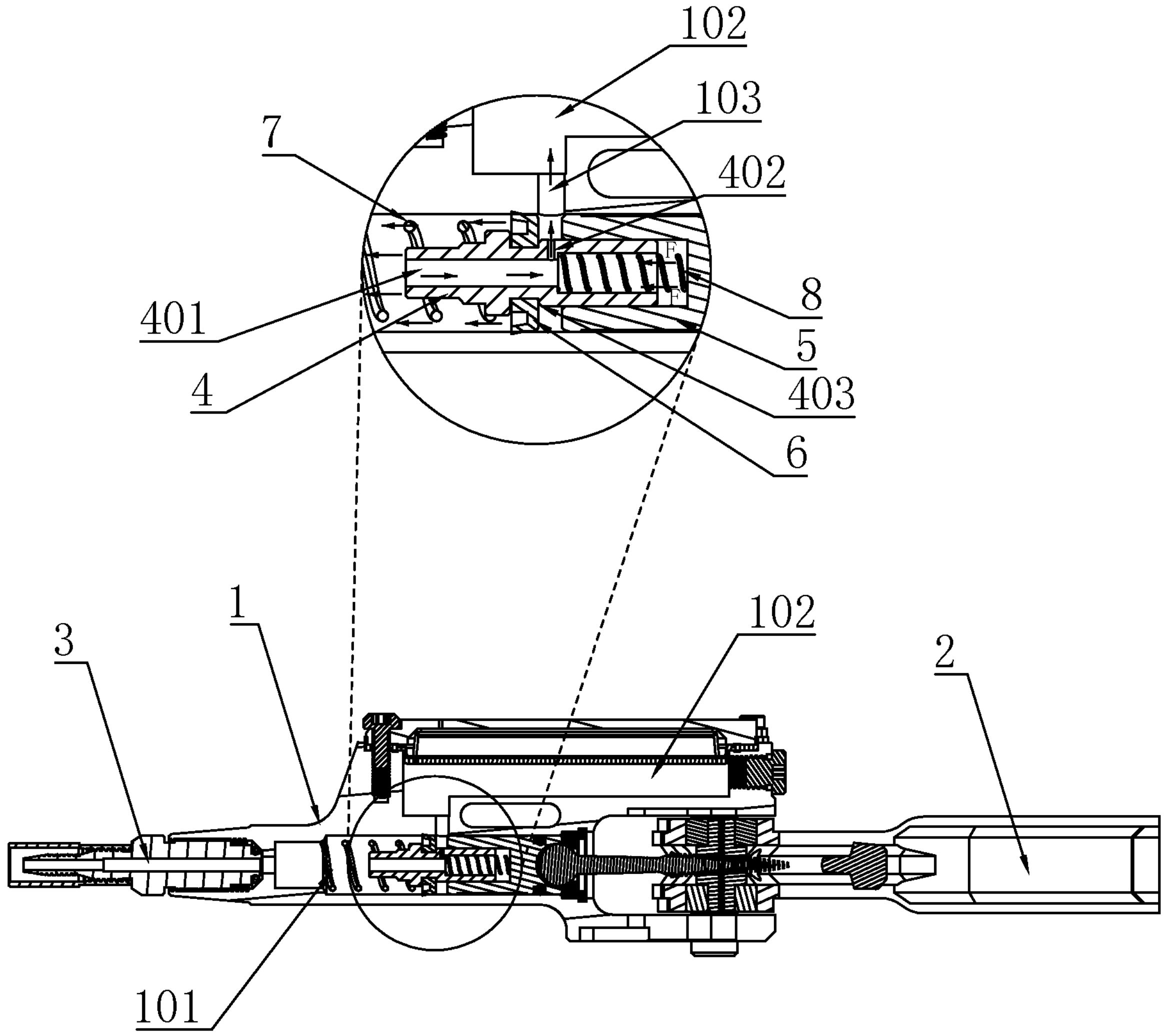
FIG. 3 is a sectional view of the present invention when it is in the initial stage of braking.
Figure 7:
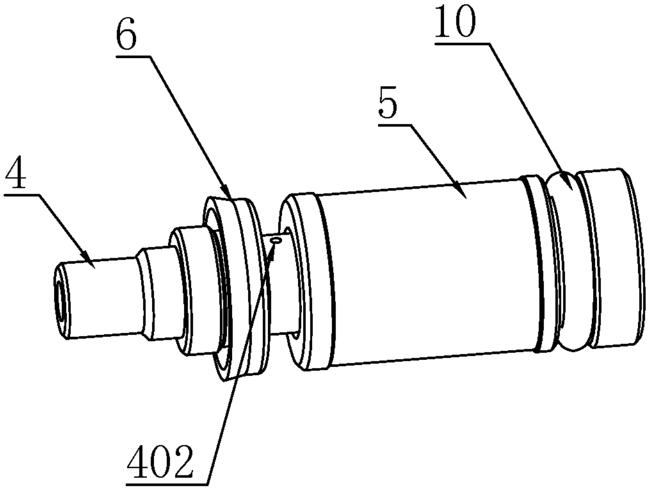
FIG. 7 is a structural schematic diagram of the front piston rod and the rear piston rod when the brake is in the initial stage.

The above content is the basic structural scheme of the present invention. When it works, the oil circuit will change with the different amplitudes of pinching the handle 2. The specific working principle is as follows:

Referring to FIGS. 3 and 7, in the first section of pinching the handle 2, the overflow hole 402 and the rear piston rod 5 are staggered from each other; the piston assembly drives the one-way oil seal 6 to move forward, and the one-way oil seal 6 squeezes the brake oil in the pressure cylinder 101 and causes a part of the brake oil to enter the reservoir 102 after passing through the oil guiding cavity 401, the overflow hole 402, and the oil pressure regulating hole 103 in sequence; another part of the brake oil flows to the brake oil pipe 3. At this stage, part of the brake oil in the pressure cylinder 101 flows back to the reservoir 102, and part of the brake oil acts on the brake pads through the brake oil pipe 3, so when pinching the handle 2, the feel is relatively light (small resistance), and the corresponding braking force is not strong, which is a light braking effect.

Figure 4:
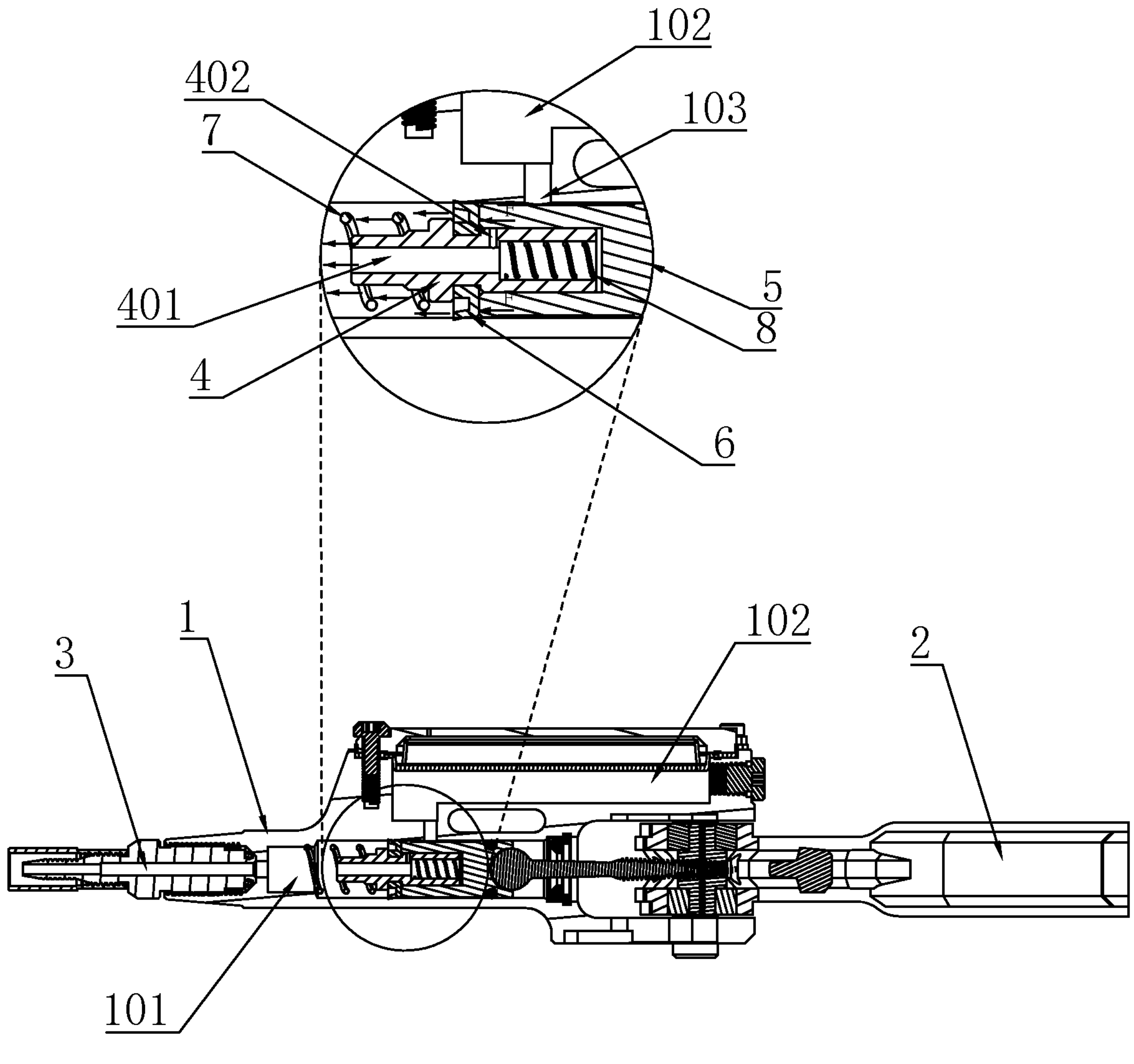
FIG. 4 is a sectional view of the present invention when it is in the middle and late stages of braking.
Figure 8:
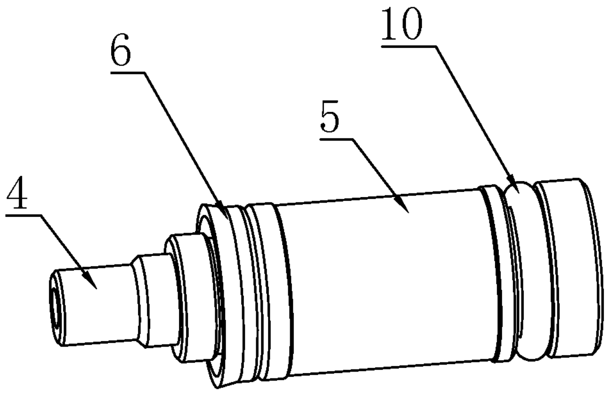
FIG. 8 is a structural schematic diagram of the front piston rod and the rear piston rod when the brake is in the middle and late stages.

Referring to FIGS. 4 and 8, in the middle and rear sections of pinching the handle 2, the rear end of the front piston rod 4 enters the push cavity 501, and the front end of the rear piston rod 5 abuts against the one-way oil seal 6 and blocks the overflow hole 402; the piston assembly drives the one-way oil seal 6 to move forward, and the one-way oil seal 6 squeezes the brake oil in the pressure cylinder 101 and causes the brake oil to flow to the brake oil pipe 3. At this stage, the oil return circuit to the reservoir 102 is blocked, so all the brake oil will act on the brake pads through the brake oil pipe 3, so when pinching the handle 2, the corresponding braking force is strong, which is a heavy braking effect.

When the handle 2 is released, since a one-way oil seal 6 is used, the brake oil can be supplemented into the pressure cylinder 101 through the gap between the one-way oil seal 6 and the pressure cylinder 101 (i.e., the subsequent lubrication gap 9), so that the oil circuit is balanced Pressurized and the handle 2 is returned to its initial position.

In summary, compared with the prior art, the structural change and advantages made by the basic scheme of the present invention are: 1. A new oil circuit is formed by the oil guiding cavity 401 and the overflow hole 402 formed on the front piston rod 4, so that only one oil pressure regulating hole is reserved between the pressure cylinder 101 and the reservoir 102, and only one one-way oil seal 6 is used on the piston assembly to achieve brake use function; 2. The redundant hole positions on the brake body 1 are eliminated, and the hole diameter of the oil pressure regulating hole 103 is larger, so fine processing can be performed on it to remove the burrs on the surface, thereby preventing the one-way oil seal 6 from flowing during the movement of the piston assembly. Scratched by burrs, playing an effective protective role; 3. The only one-way oil seal 6 not only plays the function of assisting the brake oil during braking, but also plays the function of one-way sealing, and can also play the function of blocking the overflow hole 402 at a specific stage; 4. Reduced The number of one-way oil seals 6 reduces the chance of oil leakage and reduces the difficulty of the process and the cost of parts.

Embodiment 2

In some preferred embodiments of the present invention, a first elastic member 7 is provided between the front end of the front piston rod 4 and the pressure cylinder 101, and a second elastic member 8 is provided between the rear end of the front piston rod 4 and the rear piston rod 5. Among them, the spring elasticity of the first elastic member 7 is greater than the spring elasticity of the second elastic member 8.

Figure 2:
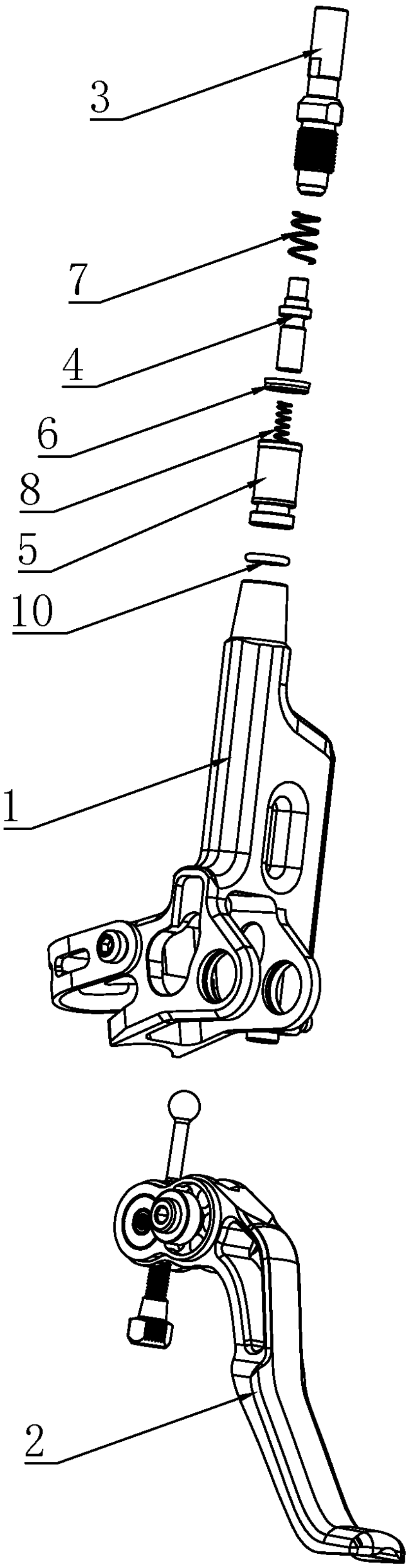
FIG. 2 is an exploded view of the present invention.

The working principle of this embodiment is: Referring to FIGS. 2 to 4, when the user pinches the handle 2 in the first section, on the one hand, the rear piston rod 5 mainly drives the front piston rod 4 to move forward through the second elastic member 8, and on the other hand, due to the difference between the first elastic member 7 and the second elastic member 8, the rear piston rod 5 moves forward relative to the front piston rod 4. The amount of movement is greater. In the middle and rear sections of pinching the handle 2, the second elastic member 8 has been compressed to a minimum and the rear piston rod 5 abuts against the one-way oil seal 6. At this time, the rear piston rod 5 is about to block the overflow hole 402, and the rear piston rod 5 continues to pinch the handle 2. The piston rod 5 and the front piston rod 4 move forward together (at this time, the rear piston rod 5 mainly drives the front piston rod 4 through the one-way oil seal 6, and the forward movement is the same) and the first elastic member 7 is further compressed.

After releasing the handle 2, under the action of the first elastic member 7 and the second elastic member 8, and the return oil pressure of the brake oil, the front piston rod 4 and the rear piston rod 5 are returned to the initial position state.

The setting of the second elastic member 8 in this embodiment belongs to the preferred scheme, and this component can also be cancelled, and the basic function of the present invention can also be realized.

Embodiment 3

Figure 5:
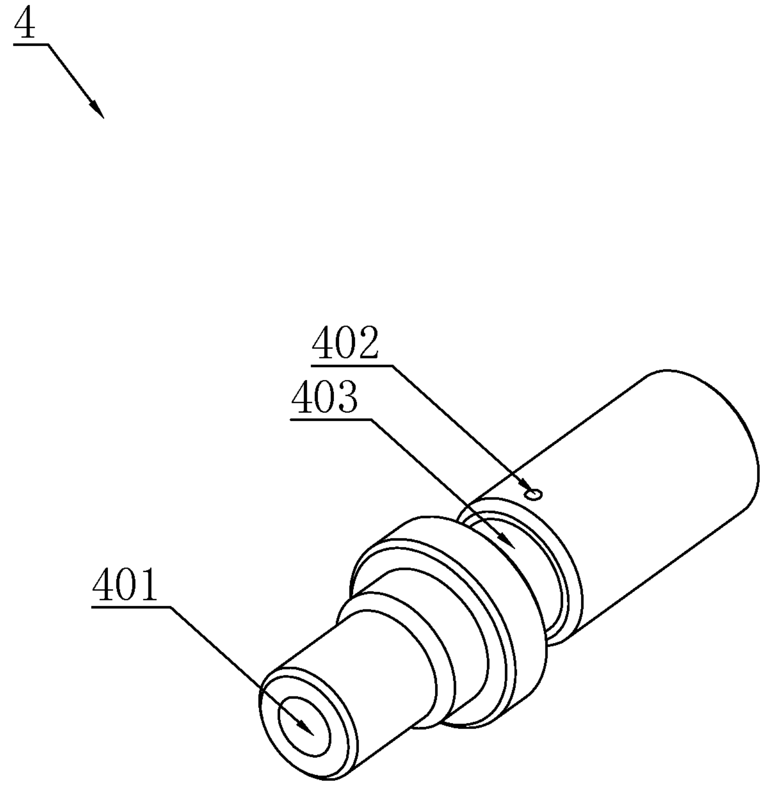
FIG. 5 is a structural schematic diagram of the front piston rod.
Figure 6:
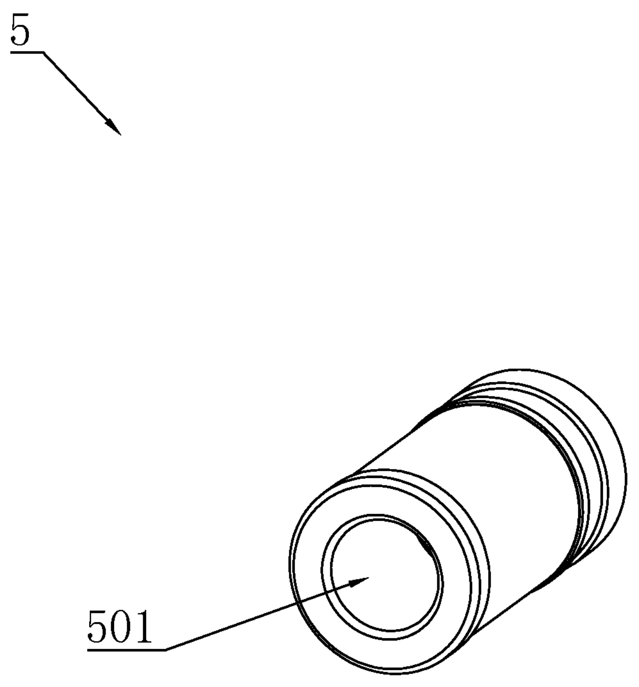
FIG. 6 is a structural schematic diagram of the rear piston rod.

Referring to FIG. 5, in some preferred embodiments of the present invention, an assembly groove 403 is provided on the outer wall of the front piston rod 4, and the one-way oil seal 6 is embedded in the assembly groove 403 to realize the positioning and assembly of the one-way oil seal 6. In particular, when the rear piston rod 5 abuts and applies pressure with the one-way oil seal 6, the one-way oil seal 6 can always be kept in a stable position relative to the front piston rod 4, ensuring the sealing effect and the blocking effect of the overflow hole 402.

Embodiment 4

Figure 9:
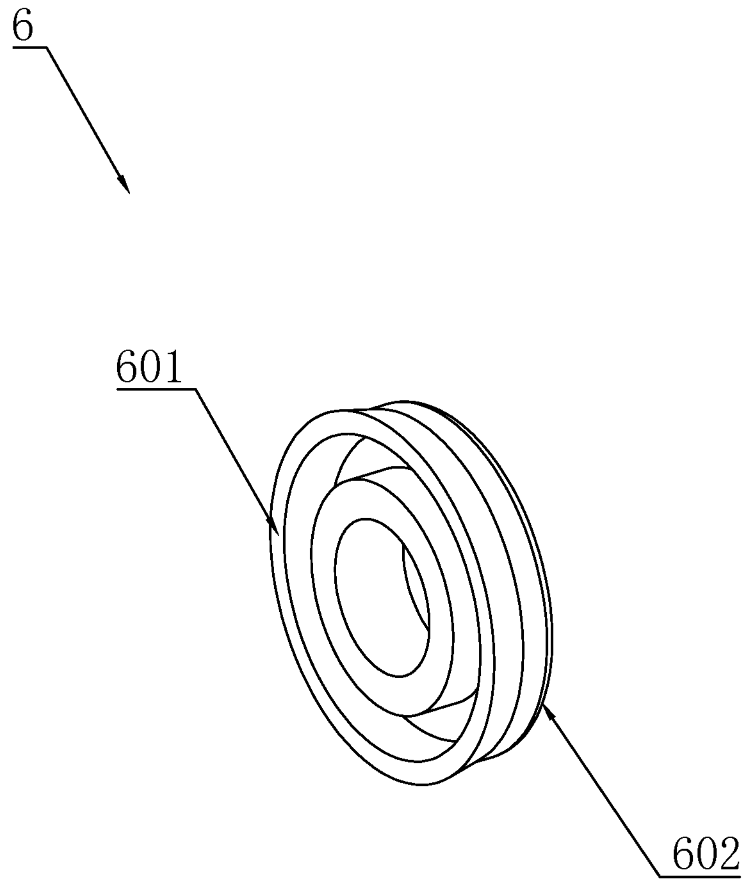
FIG. 9 is a structural schematic diagram of the one-way oil seal.
Figure 10:
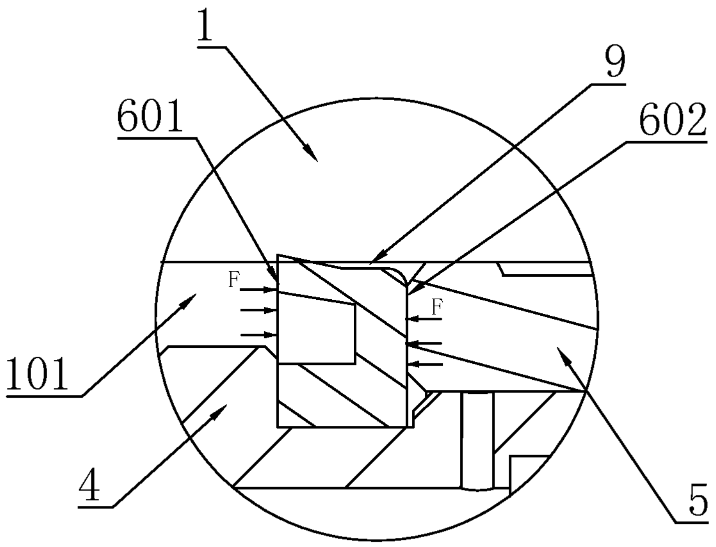
FIG. 10 is a schematic diagram of the cooperation between the one-way oil seal and the pressure cylinder.
Figure 11:
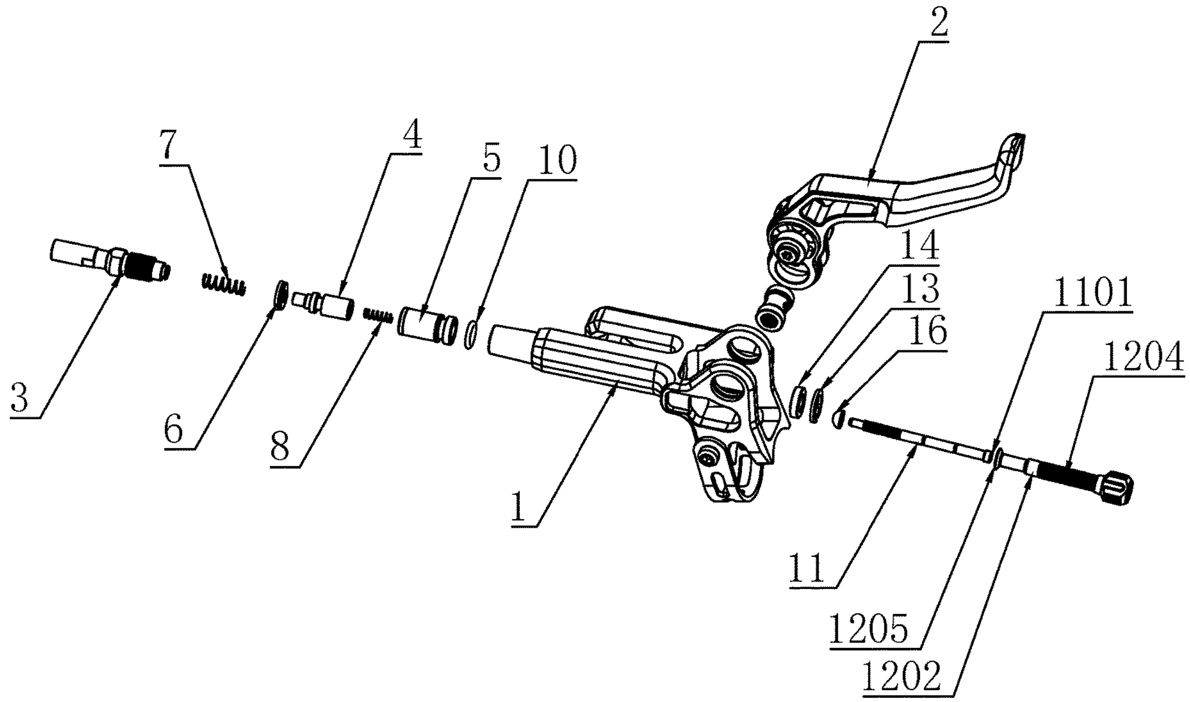
FIG. 11 is an exploded view of Embodiment 5.

Regarding the preferred sealing structure inside the brake of the present invention, referring to FIGS. 9 to 10, it is specifically as follows:

The front side of the one-way oil seal 6 is the sealing side 601, and the sealing side 601 abuts against the inner wall of the pressure cylinder 101; the rear side of the one-way oil seal 6 is the non-sealing side 602601, and the non-sealing side 602601 is provided between the inner wall of the pressure cylinder 101. There is a lubrication gap 9. When the handle 2 is pinched, the piston assembly moves forward, and the one-way oil seal 6 forms a sealing fit with the pressure cylinder 101 to push the brake oil on the front side of the front piston rod 4 forward; when the handle 2 is released, the piston assembly moves backward, and the brake oil in the reservoir 102 passes through the lubrication gap 9 Entering the front side of the front piston rod 4 has supplemented the space gap during retraction, so that the front and rear pressures are balanced and smoothly returned to position.

A two-way seal 10 is sleeved on the outer wall of the rear piston rod 5, and the two-way seal 10 abuts against the inner wall of the pressure cylinder 101. When the rear piston rod 5 moves back and forth, the two-way seal 10 and the inner wall of the pressure cylinder 101 are always tightly engaged, thereby effectively preventing the brake oil in the pressure cylinder 101 from leaking out.

Embodiment 5

Figure 12:
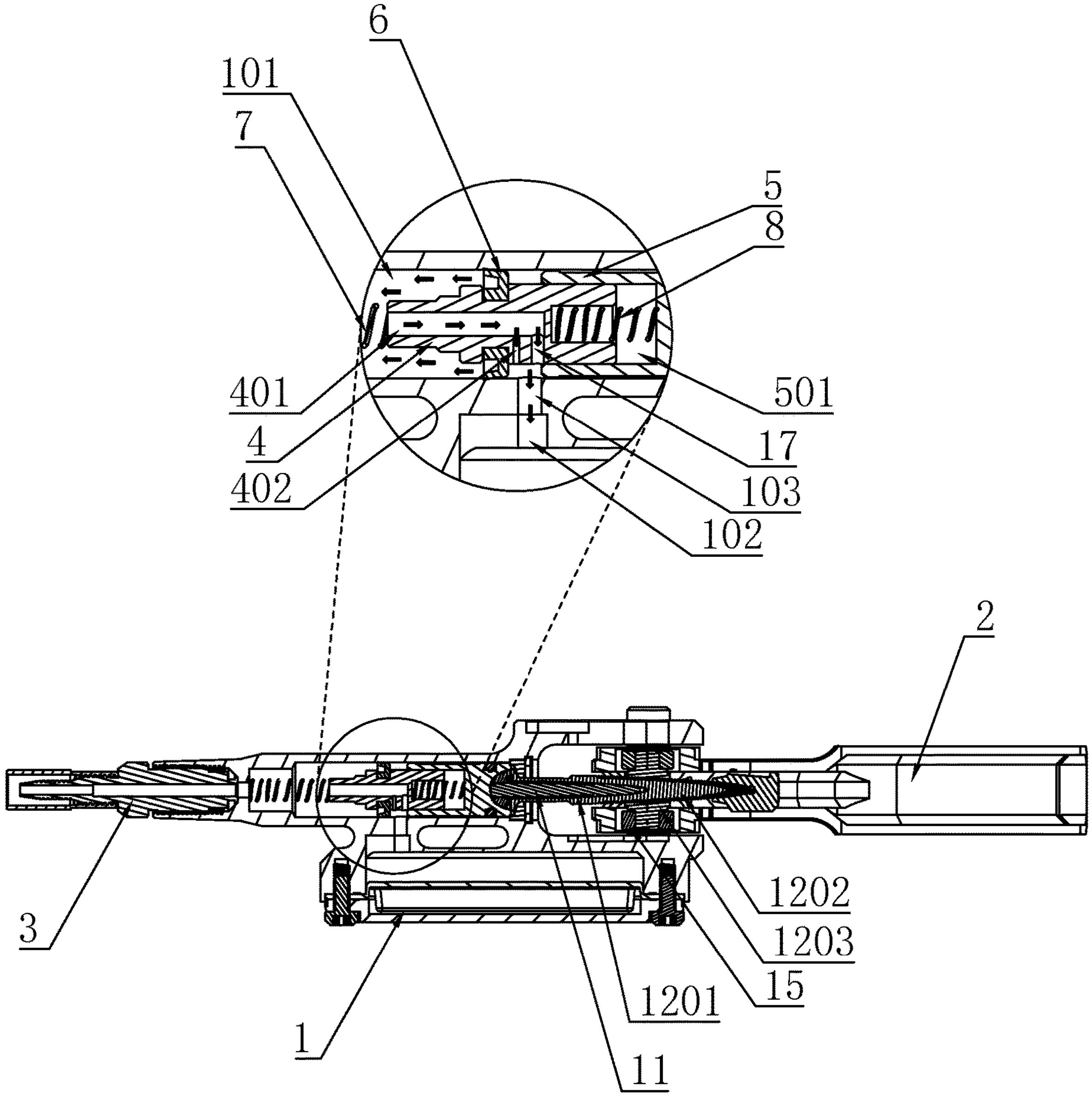
FIG. 12 is a sectional view of Embodiment 5 when it is in the production oil filling stage.
Figure 13:
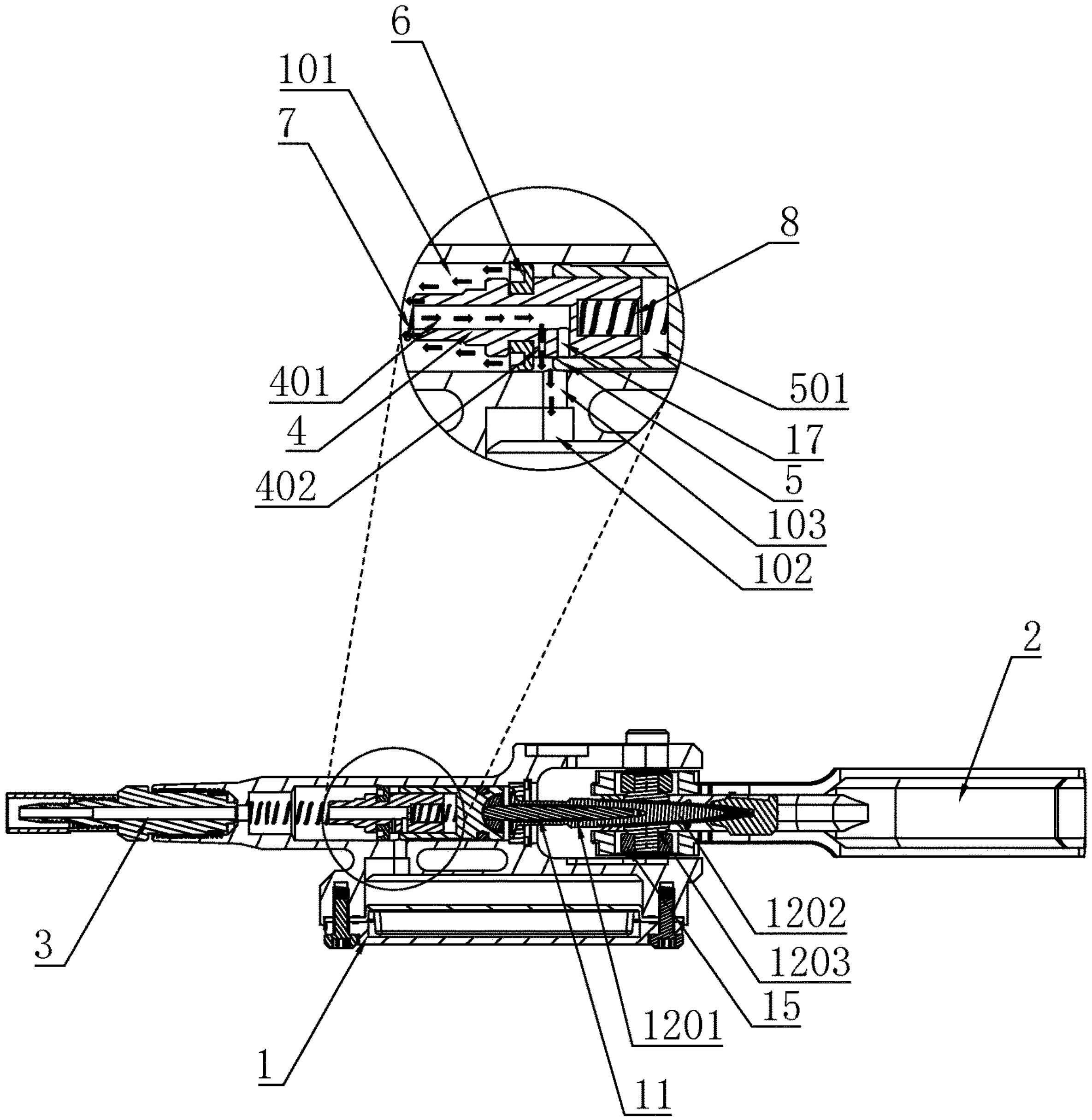
FIG. 13 is a sectional view of Embodiment 5 during the initial stage of braking.
Figure 14:
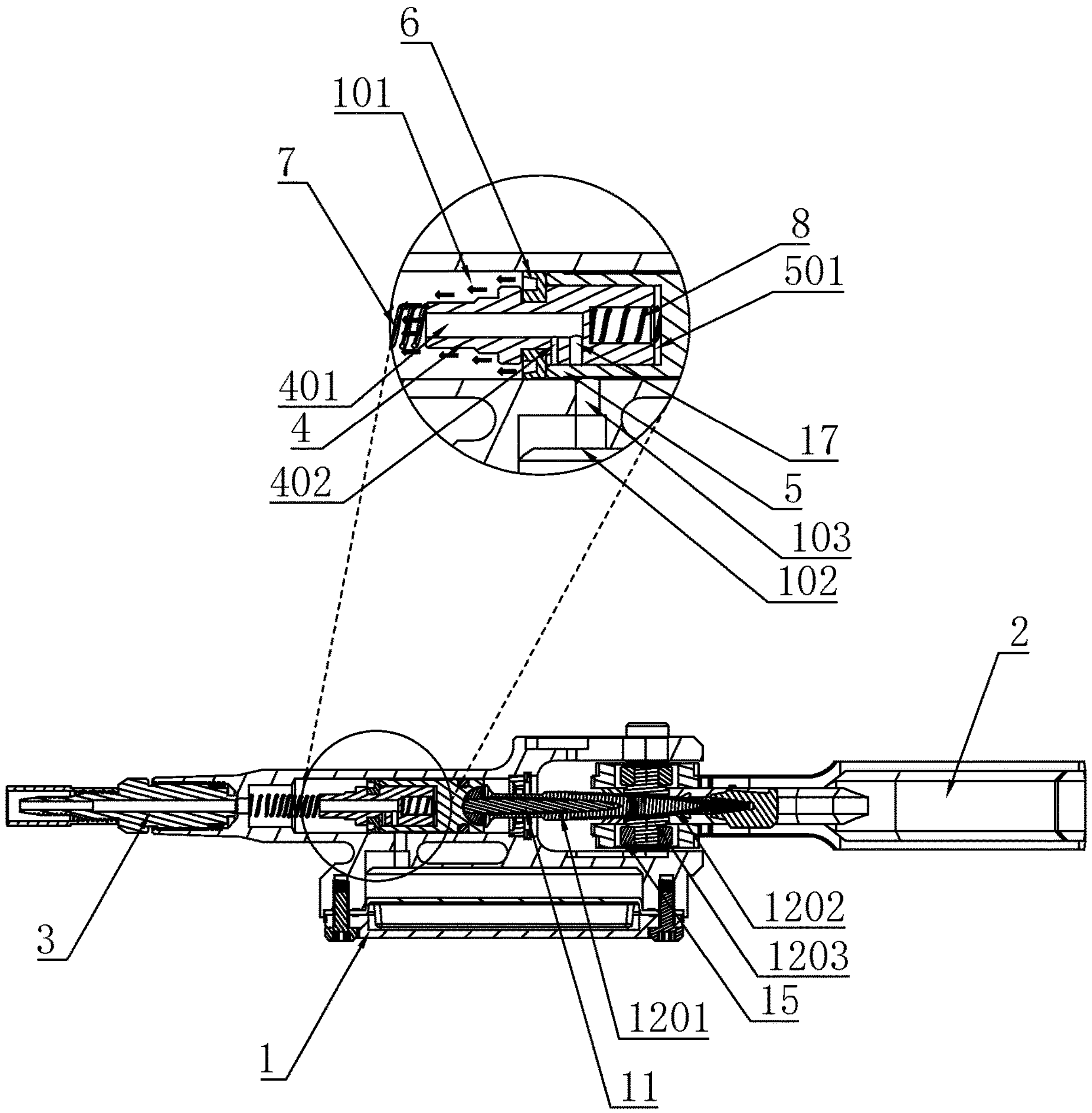
FIG. 14 is a sectional view of Embodiment 5 when it is in the middle and late stages of braking.
Figure 15:
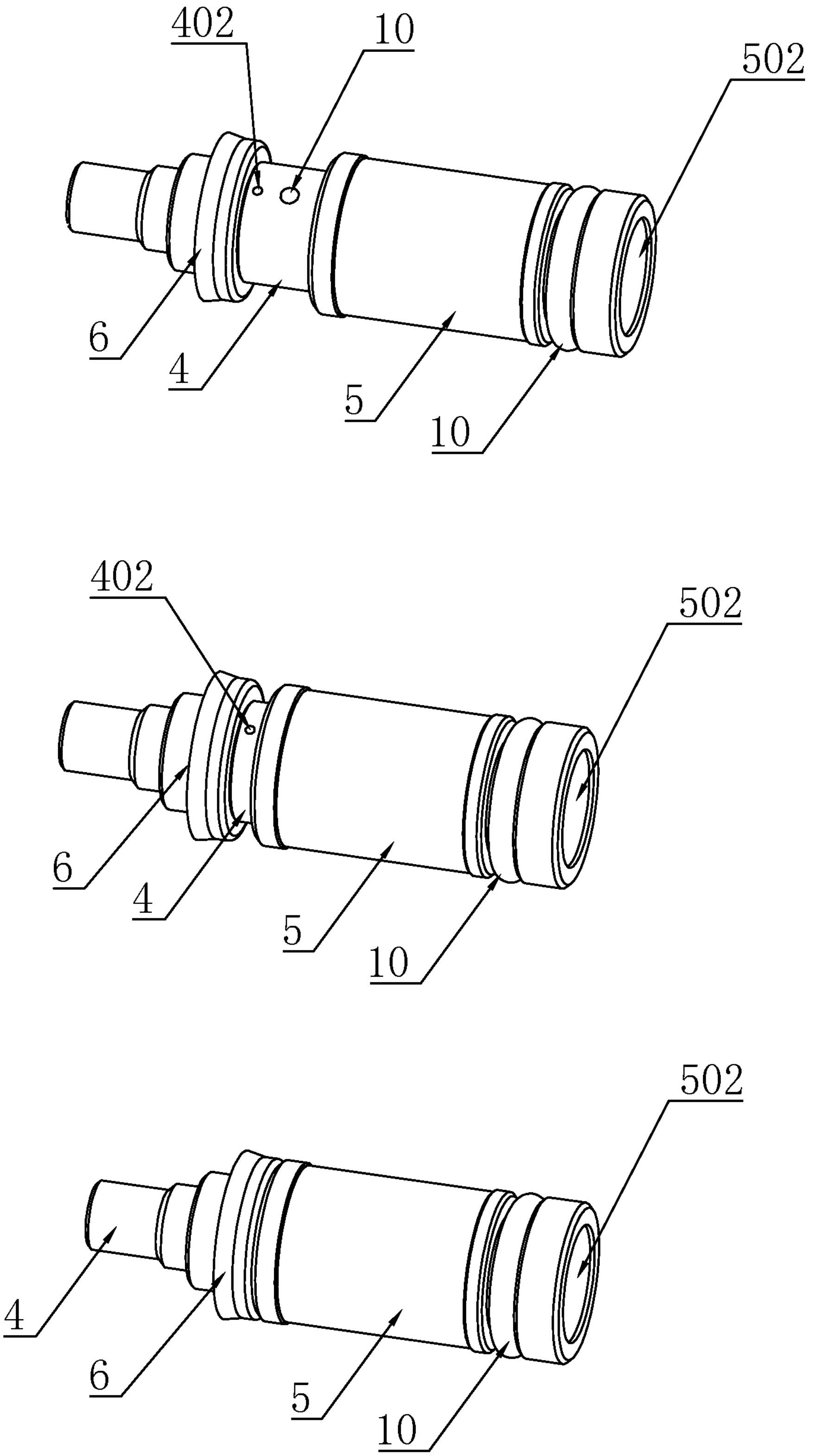
FIG. 15 is a schematic structural comparison diagram of the piston assembly in Embodiment 5 when it is in production oil filling, initial braking, and middle and late braking.
Figure 16:
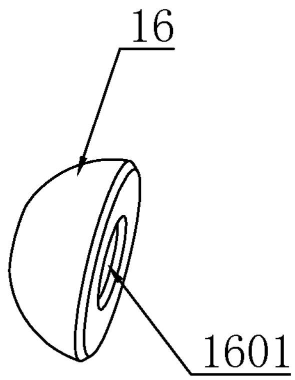
FIG. 16 is a structural schematic diagram of the ball head block.
Figure 17:
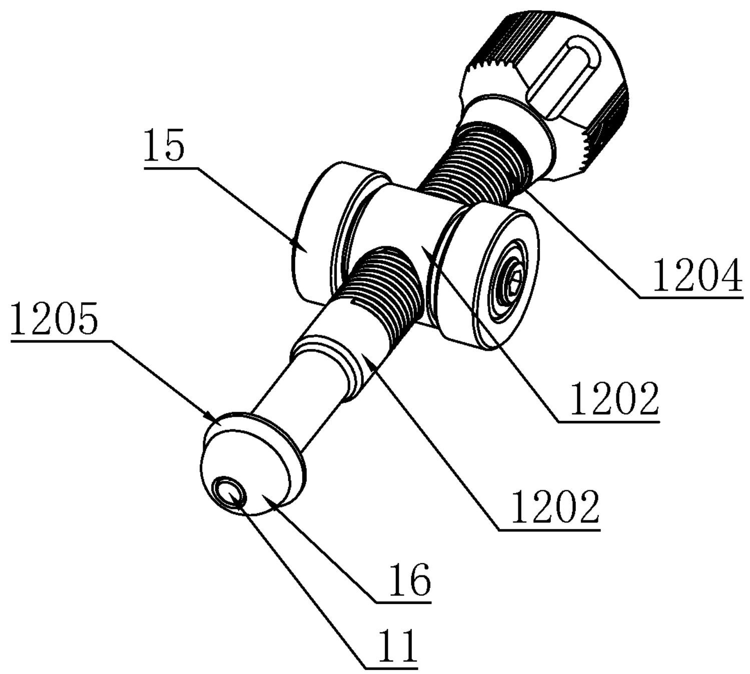
FIG. 17 is an assembly schematic diagram of the ball head block, the push rod assembly, and the driving sleeve.

Referring to FIGS. 11 to 17, an upgraded structure of the present invention is: an oil injection hole 17 is also provided on the side wall of the front piston rod 4, the overflow hole 402 communicates with the oil guiding cavity 401, and the oil injection hole 17 is located at the rear of the overflow hole 402; also includes an adjusting rod 11, the adjusting rod 11 acts on the rear piston rod 5 to adjust the initial position of the rear piston rod 5 relative to the front piston rod 4, so that the rear piston rod 5 can block or avoid the oil injection hole 17 at the initial position. Its working mechanism is as follows:

During the production process, referring to FIGS. 12 and 15, by adjusting the initial position of the rear piston rod 5, the rear piston rod 5 is moved away from the front piston rod 4, so that the rear piston rod 5 avoids the oil injection hole 17 at the initial position, so that the oil injection hole 17 is exposed, At this time, the oil guiding cavity 401, the oil injection hole 17, the oil pressure regulating hole 103, and the reservoir 102 are connected in sequence, and sufficient brake oil can be smoothly injected into the reservoir 102 from the pressure cylinder 101. Under this position state, the overflow hole 402 is also exposed, so the overflow hole 402 can also play the function of balancing pressure and assisting oil injection to further reduce the difficulty of oil injection and improve the efficiency of oil injection.

After the oil injection is completed, by adjusting the initial position of the rear piston rod 5, the rear piston rod 5 is moved closer to the front piston rod 4, so that the rear piston rod 5 blocks the oil injection hole 17 at the initial position. At this time, the oil injection hole 17 is covered and loses the oil The circuit conduction function, that is, the brake switches to the use state.

In the use state, the oil guiding cavity 401, the overflow hole 402, the oil pressure regulating hole 103, and the reservoir 102 are connected in sequence to realize the oil circuit function, and the oil injection hole 17 is not connected to obtain a more linear brake feel. The specific working principle is the same as that of Embodiment 1, and it will not be described in detail here.

Preferably, the hole diameter of the oil injection hole 17 is larger than the hole diameter of the overflow hole 402. By increasing the size of the oil injection hole 17, the obstruction during oil injection is reduced, and the oil injection is more relaxed and smooth.

The scheme of this embodiment mentions that in order to achieve the corresponding function, it is necessary to adjust the initial position of the rear piston rod 5 relative to the front piston rod 4, that is, a preferred scheme is provided, which is specifically as follows:

Referring to FIGS. 11 to 14 and 16 to 17, the handle 2 is transmissionally connected to the rear piston rod 5 through the push rod assembly 12, the adjusting rod 11 is provided on the push rod assembly 12, and the adjusting rod 11 is provided, can move relative to the push rod assembly 12. Further, the push rod assembly 12 has an internal threaded hole 1201, the adjusting rod 11 is threaded through the internal threaded hole 1201 and forms a threaded connection with the push rod assembly 12; the front end of the adjusting rod 11 can be in contact with the rear piston rod 5, and the rear end of the adjusting rod 11 is provided with an adjustment portion 1101.

In the above method, the adjusting rod 11 and the push rod assembly 12 adopt a structure that is close to the shaft center, on the one hand, through the threaded connection relationship between the two, the relative position adjustment function is realized, and then the purpose of adjusting the initial position of the rear piston rod 5 is achieved; on the other hand, The adjusting rod 11 does not take up too much space structure and can be the same size as the existing brake.

Preferably, the adjustment portion 1101 is a tool plug 1601. A corresponding tool such as a screwdriver can be inserted into the tool plug 1601 for adjustment. Among them, the shape of the tool plug 1601 can be a conventional slotted type, a cross type, or other shapes, which are not specifically limited here.

A further setting for the above technical solution is that the push rod assembly 12 includes a push rod body 1202 and a driving sleeve 1203, the outer wall of the push rod body 1202 is provided with an external thread 1204, the driving sleeve 1203 and the push rod body 1202 are threaded and connected, and the handle 2 forms a transmission fit with the driving sleeve 1203 through the bearing 15. On the one hand, the transmission function between the handle 2 and the push rod body 1202 is realized by setting the driving sleeve 1203; on the other hand, the position of the handle 2 relative to the brake body 1 can be adjusted by adjusting the thread connection position between the driving sleeve 1203 and the push rod body 1202, function.

In the prior art, the push rod assembly 12 and the ball head block 16 are integral, so the dual adjustment function of the rear piston rod 5 and the handle 2 position cannot be realized in this utility model.

In order to solve the defects of the prior art, the structure of the cooperation between the push rod assembly 12 and the rear piston rod 5 is as follows: referring to FIGS. 11 to 14 and 16 to 17, the push rod assembly 12 also includes a ball head block 16, the rear end of the rear piston rod 5 has a transmission groove 502, and the ball head block 16 is inserted into the transmission groove 502, and the push rod body 1202 and the adjusting rod 11 all form a transmission fit with the rear piston rod 5 through the ball head block 16. Further, the ball head block 16 is provided with a jacking hole 1601, and the end of the adjusting rod 11 is threaded through the jacking hole 1601; the front end portion of the push rod body 1202 extends outward to form a ring of flanges 1205, and the rear side of the rear piston rod 5 is provided with a snap ring 13, and the flange 1205 is provided between the snap ring 13 and the rear piston rod 5. When adjustment is needed, on the one hand, the adjusting rod 11 can be used to act on the ball head block 16 alone, and then the ball head block 16 can be used to drive the rear piston rod 5 to realize the initial position adjustment function of the rear piston rod 5; when braking, the handle 2 drives the push rod The body 1202 moves, and the flange 1205 on the push rod body 1202 forms a large-area contact with the ball head block 16, which plays a good force transmission effect, and then the ball head block 16 can be used to drive the rear piston rod 5 forward.

Preferably, the snap ring 13 and the flange 1205 are also in contact with the soft rubber pad 14, which can play a good buffering and protection effect, reduce the wear of hard contact between the parts, and extend the service life of the parts.

It is worth noting that other technical solutions of the present invention all belong to the prior art, so they will not be described in detail.

The above description is only the preferred embodiment of the present invention, it should be pointed out that for ordinary technicians in the technical field, on the premise of not departing from the design concept of the present invention, several improvements and modifications can be made, and these improvements and modifications should also be considered within the scope of protection of the present invention.

The invention claimed is:

1. A Hydraulic Brake with Dual Piston Structure, comprising a brake body (1), a handle (2) connected to one end of the brake body (1), and a brake oil pipe (3) connected to the other end of the brake body (1);

the brake body (1) is provided with a pressure cylinder (101) and a storage cylinder (102), the pressure cylinder (101) is equipped with a piston assembly acted upon by the handle (2), and the pressure cylinder (101) is interconnected with the storage cylinder (102) through an oil pressure regulating orifice (103), the piston assembly includes a front piston rod (4) and a rear piston rod (5), wherein a pushing chamber (501) is opened in the rear piston rod (5), and the rear end of the front piston rod (4) can enter the pushing chamber (501);

characterized in that: the front piston rod (4) is provided with a guide oil chamber (401), and the side wall of the front piston rod (4) is provided with a through overflow hole (402) communicating with the guide oil chamber (401);

a one-way oil seal (6) is also fitted on the front piston rod (4), which abuts against the inner wall of the pressure cylinder (101), and the one-way oil seal (6) is located in front of the overflow hole (402);

at the initial portion of squeezing the handle (2), the overflow hole (402) is staggered with the rear piston rod (5); the piston assembly drives the one-way oil seal (6) to move forward, and the one-way oil seal (6) compresses the brake oil in the pressure cylinder (101) and causes some of the brake oil to enter the storage cylinder (102) successively through the guide oil chamber (401), overflow hole (402), and oil pressure regulating orifice (103); another part of the brake oil flows into the brake oil pipe (3);

at the middle and rear portion of squeezing the handle (2), the rear end of the front piston rod (4) enters the pushing chamber (501), the front end of the rear piston rod (5) abuts against the one-way oil seal (6) and seals the overflow hole (402); the piston assembly drives the one-way oil seal (6) forward, and the one-way oil seal (6) compresses the brake oil in the pressure cylinder (101) and causes the brake oil to flow into the brake oil pipe (3).

2. The Hydraulic Brake with Dual Piston Structure according to claim 1, characterized in that: a first elastic member (7) is provided between the front end of the front piston rod (4) and the pressure cylinder (101), and a second elastic member (8) is provided between the rear end of the front piston rod (4) and the rear piston rod (5).

3. The Hydraulic Brake with Dual Piston Structure according to claim 2, characterized in that: the spring force of the first elastic member (7) is greater than the spring force of the second elastic member (8).

4. The Hydraulic Brake with Dual Piston Structure according to claim 1, characterized in that: an assembly groove (403) is opened on the external wall of the front piston rod (4), and the one-way oil seal (6) is embedded in the assembly groove (403).

5. The Hydraulic Brake with Dual Piston Structure according to claim 1, characterized in that: the front side of the one-way oil seal (6) is a sealing side (601) that abuts against the inner wall of the pressure cylinder (101); the rear side of the one-way oil seal (6) is a non-sealing side (602) with a clearance gap (9) between the non-sealing side (602) and the inner wall of the pressure cylinder (101).

6. The Hydraulic Brake with Dual Piston Structure according to claim 1, characterized in that: a bidirectional sealing member (10) is fitted on the external wall of the rear piston rod (5), and the bidirectional sealing member (10) abuts against the inner wall of the pressure cylinder (101).

7. The Hydraulic Brake with Dual Piston Structure according to claim 1, characterized in that: an oil injection hole (17) is opened on the side wall of the front piston rod (4), the overflow hole (402) communicates with the guide oil chamber (401), and the oil injection hole (17) is located behind the overflow hole (402); also including a adjusting rod (11) acting on the rear piston rod (5) to adjust the initial position of the rear piston rod (5) relative to the front piston rod (4), so that the rear piston rod (5) can block or avoid the oil injection hole (17) in the initial position.

8. The Hydraulic Brake with Dual Piston Structure according to claim 7, wherein the diameter of the oil injection hole (17) is greater than the diameter of the overflow hole (402).

9. The Hydraulic Brake with Dual Piston Structure according to claim 7, wherein the handle (2) is connected to the rear piston rod (5) through a push rod assembly (12), with an adjusting rod (11) positioned on the push rod assembly (12) and capable of relative movement.

10. The Hydraulic Brake with Dual Piston Structure according to claim 9, wherein the push rod assembly (12) has an internal threaded hole (1201), through which the adjusting rod (11) passes and creates a threaded connection with the push rod assembly (12); the front end of the adjusting rod (11) can abut against the rear piston rod (5), and the rear end of the adjusting rod (11) has an adjustment section (1101).

11. The Hydraulic Brake with Dual Piston Structure according to claim 9, wherein the push rod assembly (12) includes a push rod body (1202) and a drive sleeve (1203), with the outer wall of the push rod body (1202) having external threads (1204), and the drive sleeve (1203) having a threaded connection with the push rod body (1202), and the handle (2) is engaging the drive sleeve (1203) through a bearing (15).

12. The Hydraulic Brake with Dual Piston Structure according to claim 9, wherein the push rod assembly (12) further includes a ball head block (16), with the rear end of the rear piston rod (5) having a drive groove (502), into which the ball head block (16) is inserted, and both the push rod body (1202) and the adjusting rod (11) form a drive connection with the rear piston rod (5) through the ball head block (16).

13. The Hydraulic Brake with Dual Piston Structure according to claim 9, wherein the ball head block (16) has a plug hole (1601) on it into which the end of the adjusting rod (11) passes; the front end of the push rod body (1202) extends outward to form a circumferential flange (1205), and the rear side of the rear piston rod (5) has a retaining spring (13), with the flange (1205) positioned between the retaining spring (13) and the rear piston rod (5).

* * * * *